(12) United States Patent
Yializis

(10) Patent No.: US 10,774,219 B2
(45) Date of Patent: Sep. 15, 2020

(54) ULTRA-BRIGHT PASSIVATED ALUMINUM NANO-FLAKE PIGMENTS

(71) Applicant: SIGMA LABORATORIES OF ARIZONA, LLC, Tucson, AZ (US)

(72) Inventor: Angelo Yializis, Tucson, AZ (US)

(73) Assignee: SIGMA LABORATORIES OF ARIZONA, LLC, Tucson, AZ (US)

( * ) Notice: Subject to any disclaimer, the term of this patent is extended or adjusted under 35 U.S.C. 154(b) by 0 days.

(21) Appl. No.: 15/488,185

(22) Filed: Apr. 14, 2017

(65) Prior Publication Data

US 2017/0218518 A1      Aug. 3, 2017

Related U.S. Application Data

(60) Division of application No. 14/673,214, filed on Mar. 30, 2015, now Pat. No. 9,637,641, which is a
(Continued)

(51) Int. Cl.
*C09C 3/10* (2006.01)
*C23C 14/00* (2006.01)
(Continued)

(52) U.S. Cl.
CPC .............. *C09C 3/10* (2013.01); *B22F 1/0055* (2013.01); *B22F 9/04* (2013.01); *B29C 41/22* (2013.01); *C09C 1/00* (2013.01); *C09C 1/0078* (2013.01); *C09C 1/64* (2013.01); *C09C 1/644* (2013.01); *C09C 3/08* (2013.01); *C09D 5/004* (2013.01); *C09D 5/10* (2013.01); *C09D 5/24* (2013.01);
(Continued)

(58) Field of Classification Search
CPC ...................................................... C23C 22/73
See application file for complete search history.

(56) References Cited

U.S. PATENT DOCUMENTS 4,065,060 A * 12/1977 Booz ...................... B02C 17/18
241/16
4,212,676 A * 7/1980 Ueda ...................... C09D 13/00
106/271
(Continued)

FOREIGN PATENT DOCUMENTS

| EP | 0081599 A1 | 6/1983 |
|---|---|---|
| WO | 2009010377 A3 | 1/2009 |
| WO | 2014042639 A1 | 3/2014 |

*Primary Examiner* — Robert A Vetere
(74) *Attorney, Agent, or Firm* — Yakov Sidorin; Quarles & Brady LLP

(57) ABSTRACT

Nano-thick flakes that are either flat, and specularly-reflective in visible light or that have microroughness intentionally controlled to disperse or interfere with visible light. Coatings and inks utilizing such flakes. Method for fabrication of such flakes in partial vacuum includes the repeated multiple times deposition of a release layer over a substrate surface and a flake layer over the release layer to form a multilayer structure further reduced to individual flakes. Reactive metal is passivated inline with the deposition of the flake layer for superior corrosion resistance. Chemically-functional materials are optionally added to the release material to transfer their functionality to the surface of flake layer to create unique functional properties on a flake surface before the multilayer structure is removed from the substrate.

7 Claims, 5 Drawing Sheets

Related U.S. Application Data continuation-in-part of application No. 11/335,039, filed on Jan. 18, 2006, now Pat. No. 9,082,320, which is a continuation-in-part of application No. 10/355,373, filed on Jan. 31, 2003.

(51) Int. Cl.

| | | |
|---|---|---|
| *B29C 41/22* | (2006.01) | |
| *C09D 7/61* | (2018.01) | |
| *C09D 11/52* | (2014.01) | |
| *C09C 1/00* | (2006.01) | |
| *G09C 1/00* | (2006.01) | |
| *C09C 1/64* | (2006.01) | |
| *G02B 5/08* | (2006.01) | |
| *C09D 11/037* | (2014.01) | |
| *B22F 1/00* | (2006.01) | |
| *B22F 9/04* | (2006.01) | |
| *C22C 32/00* | (2006.01) | |
| *C09D 7/63* | (2018.01) | |
| *C09D 5/10* | (2006.01) | |
| *C09D 7/65* | (2018.01) | |
| *C09D 5/33* | (2006.01) | |
| *C09C 3/08* | (2006.01) | |
| *C09D 5/24* | (2006.01) | |
| *C09D 17/00* | (2006.01) | |
| *C23C 14/14* | (2006.01) | |
| *C23C 14/28* | (2006.01) | |
| *C23C 22/73* | (2006.01) | |
| *B29L 9/00* | (2006.01) | |

(52) U.S. Cl.
CPC ............... *C09D 7/61* (2018.01); *C09D 7/63* (2018.01); *C09D 7/65* (2018.01); *C09D 11/037* (2013.01); *C09D 11/52* (2013.01); *C09D 17/006* (2013.01); *C22C 32/0094* (2013.01); *C23C 14/0005* (2013.01); *C23C 14/14* (2013.01); *C23C 14/28* (2013.01); *C23C 22/73* (2013.01); *G02B 5/085* (2013.01); *G09C 1/00* (2013.01); *B22F 2009/045* (2013.01); *B29K 2995/003* (2013.01); *B29L 2009/003* (2013.01); *C01P 2004/20* (2013.01); *C01P 2004/22* (2013.01); *C01P 2006/40* (2013.01); *Y10T 428/254* (2015.01)

(56) References Cited

U.S. PATENT DOCUMENTS

| | | | |
|---|---|---|---|
| 4,322,467 A * | 3/1982 | Heimbach | B41M 3/12 156/240 |
| 4,745,449 A * | 5/1988 | Chang | H01L 27/1443 257/257 |
| 4,954,371 A | 9/1990 | Yializis | |
| 5,624,076 A | 4/1997 | Miekka et al. | |
| 5,912,069 A | 6/1999 | Yializis et al. | |
| 6,112,388 A | 9/2000 | Kimoto et al. | |
| 6,398,999 B1 * | 6/2002 | Josephy | B22F 1/0007 264/81 |
| 6,447,553 B1 | 9/2002 | Mikhael et al. | |
| 6,838,183 B2 | 1/2005 | Yializis | |
| 7,005,161 B2 | 2/2006 | Mikhael et al. | |
| 7,754,106 B2 | 7/2010 | Mikhael et al. | |
| 7,820,088 B2 | 10/2010 | Josephy et al. | |
| 8,852,476 B2 | 10/2014 | Decker | |
| 2002/0041047 A1 | 4/2002 | Josephy et al. | |
| 2003/0175465 A1 * | 9/2003 | Watanabe | B32B 27/06 428/40.1 |
| 2012/0007271 A1 * | 1/2012 | Decker | C09C 1/0015 264/144 |

\* cited by examiner

ULTRA-BRIGHT PASSIVATED ALUMINUM NANO-FLAKE PIGMENTS

CROSS-REFERENCE TO RELATED APPLICATIONS

The present application is a divisional from the U.S. patent application Ser. No. 14/673,214 filed on Mar. 30, 2015 and now published as U.S. 2015/0203685, which in turn is a continuation-in-part from the U.S. patent application Ser. No. 11/335,039 filed on Jan. 18, 2006 and now issued as U.S. Pat. No. 9,082,320, which in turn is a continuation-in-part from the U.S. patent application Ser. No. 10/355,373, filed on Jan. 31, 2003 and now abandoned.

The disclosure of each of the above-identified patent applications is incorporated by reference herein.

TECHNICAL FIELD

This invention is related in general to the production of nano-thick flakes of reflective and/or transparent and/or electrically-conductive material for use in a variety of applications such as formation of decorative coatings and pigments. In particular, the invention pertains to a method for producing, in a partial vacuum environment, of a bulk multilayer release and flake material that can be reduced to individual flakes in a solvent that dissolves the release material, and for formation of individual flakes of predetermined thickness and sizes.

BACKGROUND

Metallized films are commonly produced for a variety of applications in which high-reflectivity of light is desirable, such as decorative, packaging and low-emissivity applications, for example. In conventional metal-flake pigment technology (such as in the production of vacuum based aluminum pigments), a polymer film web is coated with a dissolvable polymer layer at atmospheric conditions and a nano-thick aluminum layer is deposited over it in a vacuum chamber. This process may be repeated several times on one or both sides of the web before the aluminum is removed from the web and reduced to a nano-flake pigment in a solvent bath, while the polymer film web is discarded (see for example EP0081599 and WO2014042639).

Polymer/aluminum multilayer structures may also be produced entirely in a vacuum chamber by depositing both materials in successive layers. Such structures have been used advantageously in the past to produce aluminum pigments in powder form, where the polymer is retained with the aluminum particle (see, for example, U.S. Pat. No. 5,912,069; and A. Yializis, et al., "Low Emissivity Polymer-Metal Pigments and Coatings," 1997 Meeting of The IRIS Group On Camouflage Concealment and Deception, Volume 1, October 1997).

U.S. Pat. No. 7,754,106, teaches the production of metal oxide flake material by forming multilayer structures of release and metal oxide layers, where the release layer is formed by flash evaporating a monomeric liquid material that is deposited on a substrate as a liquid and then, using electron beam and/or plasma radiation, converted into a dissolvable solid. U.S. Pat. Nos. 6,398,999 and 7,820,088 teach a multilayer layer structure, in which the release layer is made of a thermoplastic material produced by thermal decomposition of polymers (such as acrylic and styrene resins) and polymerization using electron beam. Decomposition of a resin results in the deposition of random polymer fragments that form a layer that can be dissolved in a solvent, but it also results in many lower molecular weight gaseous products that impact the level of vacuum in a chamber, thus resulting in release coatings that are difficult to control and implement on large scale. US 20020041047 claims deposition of polymerizable and non polymerizable liquids that are partially polymerized on the surface before deposition of a flake layer. U.S. Pat. No. 8,852,476 asserts the use of polymerizable liquid release layers that partially polymerized on the surface by the heat of condensation of a metal layer.

With all diversity of disclosed processes of fabrication, there remain unaddressed practical problems stemming from inability of the existing methodologies to repeatedly produce flat and highly reflective flakes, the degradation of the flakes reduced from a multilayered structures formed in vacuum with no in-line passivation, safety issues accompanying the handling of flakes that contain non-passivated metal (such as aluminum), as well as defects of the flake material caused by the lack of such in-line passivation and those manifesting in "conglomeration" of "stacking" of the flake elements remaining not separated from one another.

The present invention is directed at providing solutions to at least some of these problems by further defining the types and chemistry of release materials that can be effectively dissolved in the process of production of individual flakes, as well as the thickness of such materials and process conditions required for production of flakes with high specular reflectivity and high corrosion resistance.

SUMMARY

Embodiments of the present invention are directed at developing a general methodology for production of flake materials as part of multilayer structures and optically flat (at least in the visible portion of the spectrum), flakes resulting from such multilayer structure. These metallic material/release material composite structures are produced entirely in a vacuum chamber either by deposition on a web using a roll-to-roll process or by continuous deposition on a rotating drum.

Embodiments of the invention are further directed at developing a process including the passivation of one or both sides of the metallic layers (and, in particular, aluminum layers) of the so-formed multilayered laminate structure before these metallic layers are exposed to moisture, to reduce the possibility of rapid oxidation and heating of the flakes and to improve the visual appearance of the flake-containing product by reducing the defects of the flakes. Embodiments of the invention are further directed at modifying surface(s) of multilayered laminate structures formed in the process of fabrication of flakes to enhance the functionality (such as resistance to corrosion and/or coloration of the flakes).

Embodiments of the invention additionally define chemistry and thickness of liquid release layers used in formation of the multilayered laminate structure to facilitate the reduction of such structure to flake elements that can be used to create a reflective coating with minimized or no visual defects.

BRIEF DESCRIPTION OF THE DRAWINGS

The invention will be more fully understood by referring to the following Detailed Description in conjunction with the generally-not-to-scale Drawings, in which similar elements are indicated with similar numbers and labels and of which.

DESCRIPTION

Figure 1:
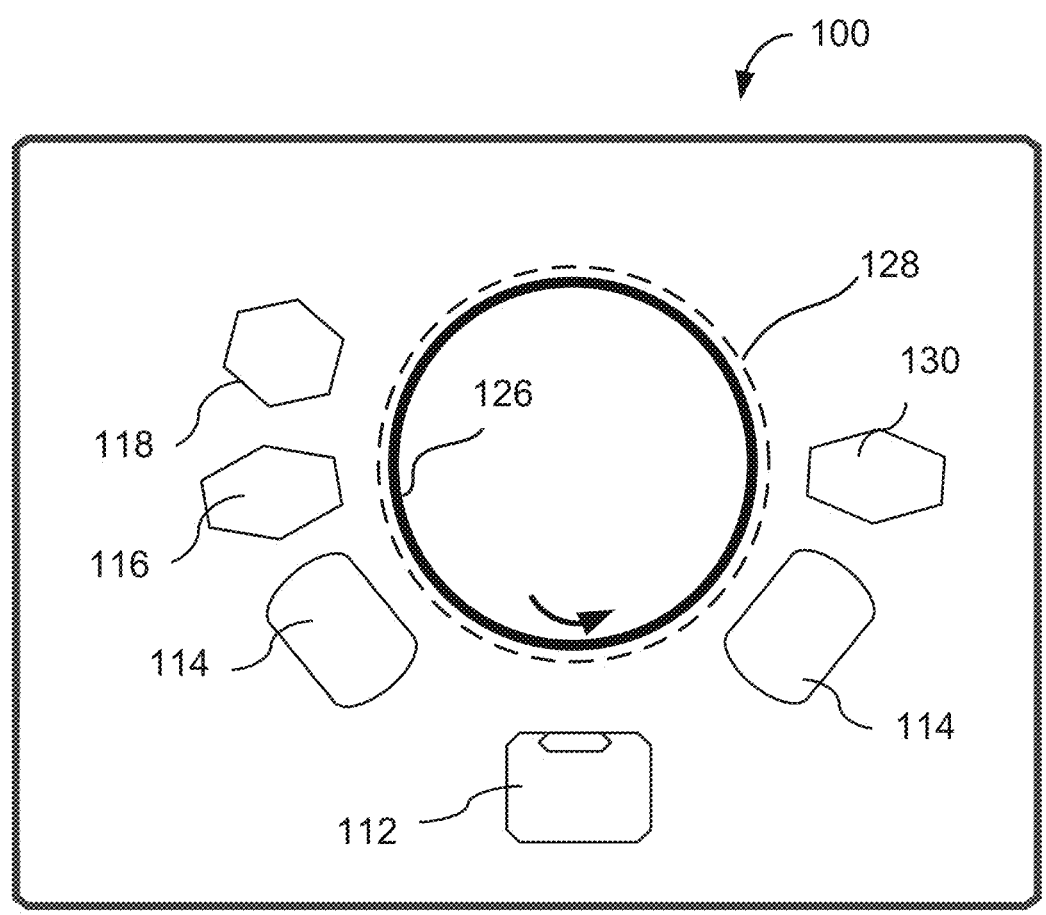
FIG. 1 is a diagram of a vacuum chamber structured, according to an embodiment of the invention, to deposit the release material and the metallic film over a rotating drum.

The related art left unaddressed multiple problems that continue to limit the practical application of existing methods for production of flakes and coatings containing the flakes.

One recognized group of problems unites defects and deterioration of the flakes from exposure to environmental factors (especially moisture) and safety concerns caused by the existing methods for fabrication of the multilayered laminate structure from which the flakes are extracted. For example, when forming a release layer/aluminum layer multilayered structure weighing tens of pounds in a single run in the vacuum on a substrate (especially with the use of a rotating drum to fabricate a structure that includes thousands of nano-thick flake material layers), the removal of such multilayered structure from the substrate often forces a breakup of the multilayer laminate material, thereby exposing to air a large surface area of nano-thick aluminum and causing its rapid oxidation with the release of exothermic energy that raises the temperature of the multilayered laminate. This, in turn, can lead to ignition or at least degradation of the organic release material of the laminate as well as the aluminum. Crushing and dissolving such material in a solvent (acetone, toluene, ethyl acetate) results in additional reaction of the aluminum with small quantities of moisture present in the solvent, which creates additional safety issues. More importantly from a production point of view, rapid reaction with oxygen and moisture in air or in a solvent, causes flakes to permanently curl, thus creating visual defects when the flake is used to produce a reflective coating. Furthermore, a hydrated aluminum oxide $Al_2O_3$ ($H_2O$) is formed on the flake surface, which is structurally inferior to $Al_2O_3$ and which has poor barrier properties and results in aluminum flakes that have reduced corrosion resistance. This group of problems is solved by passivating the metallic layer(s) (such as aluminum layer(s)) during the production of the multilayered laminate structure before the structure is removed from the vacuum chamber. The term "passivation" is used herein to refer to the process of treating a metal layer to alter its susceptibility to deterioration from exposure to environmental factors, especially moisture.

Another problem includes controlling or eliminating color variations in the appearance of metal flakes, caused by nano-sized deformations or roughness of the metallic layers of the multilayered laminate structure, originating when such layers are deposited on a liquid release layer (whether polymerizable or not). Such problem manifests in that surfaces of the constituent flakes such as aluminum flakes that have thicknesses smaller than about 500 nm and that are produced using a liquid release layer can appear bright but, at the same time, may have a certain color hue differentiating them from the flakes produced on a solid polymer layer. Such color variation is not desirable for most decorative applications and was determined to be caused by a difficult-to-detect nano-roughness on the flake surface that is so fine that it only interferes with the shorter wavelengths of visible light. That is, the flake surface reflects light at longer wavelengths of the visible radiation specularly, but disperses light at wavelengths that are on the order of the dimensions of the surface roughness (for example, blue light). This color variation is not detectable on a single flake but it results when flakes are incorporated into a clear ink and are printed onto a surface. Typically if the nano-surface roughness disperses the blue end of the spectrum, the reflective aluminum ink acquires a light brownish tinge that is not desirable.

A problem of modification of the surface of the metallic layer(s) of the multilayered laminate structure used for formation of flakes is solved by intentional addition, to the release material of such structure, of i) corrosion inhibitors and/or ii) reactive chromophores that can add color to the flakes, and/or iii) other chemical groups configured to pre-determingly enhance the performance of the flakes integrated into a coating to produce an article of manufacture that incorporates the coating.

A problem of intentional control and/or production of a micro-sized pattern of the surface of a flake that does not require embossing of an underlying polymeric layer or pre-formation of a patterned surface with the use of radiation (such as plasma or heat) is solved by depositing a metallic layer of the multilayered laminate structure directly on a liquid layer of a curable or non-curable organic material with thicknesses exceeding a threshold thickness. In the related art dealing with the curable monomer layer (see, for example, U.S. Pat. No. 6,838,183) a surface microroughness was created by using radiation such as plasma or heat to first partially cure the surface of a sufficiently thick polymerizable liquid monomer layer and then, following the creation of such microroughness, using a deeper penetrating radiation to fully cure the layer. The surface of the resulting polymer layer was furrowed and, depending on the amplitude and period of the furrows, it could interact with visible radiation to form a surface that either disperses white light or interferes with it to reflect light of various colors that change with the angle of incidence. The similar effect is also commonly achieved in the related art by forming a diffraction grating structure in a thermoplastic polymer release layer either by pressure (for example, with the roller) and/or heat to create a final flake that diffracts light and produced the effect of color shifting with the angle of incidence of light (see, for example, U.S. Pat. Nos. 6,112,388; 5,624,076; and WO 2009/010377). In implementing the ideas of the present invention, we found that, in addition to the surface cure process taught in U.S. Pat. No. 6,838,183, a metal layer can be provided with such surface as a result of direct deposition of the metal layer on a liquid layer of a curable or non-curable organic material when certain thickness of the layer is exceeded. This is a unique method for producing patterns on a flake element, because it does not require embossing of polymeric substrate or pre-formation of a patterned surface using radiation such as plasma or heat. We also found that in the case of using aluminum for the metallic layer(s) of the multilayered laminate structure, if a surface oxide is formed on the aluminum before the layer is reduced to a flake, the surface microroughness is maintained due to the added hardness provided by the higher modulus of aluminum oxide. That is flakes are produced with a surface that can retain a level of roughness that has an amplitude that is significantly larger than the thickness of the flake, thus producing flakes that can be used to produce a coating that has an appearance that can vary from a satin finish when the light is dispersed, to random colors when the light interferes with the surface roughness. We also found that flakes with certain level of micro-roughness in the visible spectrum can have specular reflection in the infrared spectrum. This is particularly important for applications where metallic flakes are incorporated in paints used to modify the emissivity of an object in the infrared without the metallic glint that is associated with flat metal flakes.

Another problem stems from the discovery that release materials that are known to work well for a web-based process to produce multilayered laminate structures with only a few layers are not equally effective for use in producing a bulk multilayered laminate with thousands of layers on a rotating drum. Specifically, although many release material chemistries facilitate the reduction of the bulk nanolaminate to flake elements by use of solvents and methods of diminution, when using the resulting flakes to produce a reflective coating certain defects—such as the presence of curved or curled flakes or conglomerated/stacked flakes—become apparent and must be overcome by using fabrication processes that minimize or eliminate such curled flakes and flake stacks. This problem of repeatedly achieving high-quality reduction of the bulk multilayered laminate structure to flake elements that are substantially devoid of curled flakes and flake-stacks is solved by defining chemistry and thickness of the liquid release layer(s) by employing the inline metal passivation process and release layer chemistry that includes non-polymerizable organic materials.

For the purposes of this disclosure, the terms "flake material", "flake layer", and "flake precursor" refer to or represent a material which may be deposited on a substrate according to an embodiment of the invention to produce a film intended to be crushed to yield flakes. Examples of material appropriate for this purpose include metals as well as metal oxides (such as ITO and IZO) and polymers (such as color polymers, or polymers with a specific refractive index or other specifically defined physical and/or chemical property).

The terms "metal" and "metallic" are used interchangeably, with understanding that a reference to "aluminum" provides but one non-limiting example of the metal. For example, a reference to passivating an aluminum surface provide but an example of a more general passivating a surface of a metallic layer.

The terms "flake" and "flake element" are used interchangeably and refer to a small segment of an extended flake layer that is originated from such flake layer as a result of a diminution process. It should be noted that most, if not all, flakes may have a small amount of release material present on their surface. As determined by a thermogravimetric analysis (TGA), the amount of organic material on the surface is on the order of 2% of the total weight of a flake. Accordingly, a metal flake element may also contain some small amount of a release material on its surface.

The terms "nano-roughness", "micro-roughness", "furrowed", "furrow", as applied to a surface of a flake, are used to identify an irregularity or a pattern on the flake's surface. Nano-roughness is used to identify a surface deformation that as an amplitude and period typically on the order of 100 nm or less, while a micro-roughness and a furrow refer to a surface relief with characteristic dimensions on the order of one micrometer or larger. The terms "micro-roughness" and "furrow" may be used interchangeably.

The terms "organic material", "organic layer", "release layer", "organic compound" and "release material" are used interchangeably to refer to a substance used to isolate interleaved layers of flake material from one another in a multilayer structure and that allows for separation and reduction of the flake material into individual flakes. Such separation and reduction is typically performed by dissolving the release material in a solvent, although other methods such as decomposition of the release material in a reactive plasma or high thermal decomposition of the release are also possible. It should be noted that inorganic release materials—such as salts or other inorganics that can dissolve in aqueous or non aqueous solvents and can be condensed on a substrate surface in vacuum—can also be used as release materials. The terms such as "dissolved", "extraction", and "extractable" are used in this disclosure with reference to release materials to mean that the release materials can be dissolved in the presence of a solvent to allow the formation of individual flakes from continuous, extended flake layers formed on a web or a rotating process drum. Implementations of this invention utilize release layers that have a thickness that results in a cumulative weight that is about the same as that of the metal flake layers. Given that in most inks and paints the percent of aluminum flakes (by weight) is a small fraction of the total ink or paint binder, the release layer does not have to be extracted and can be integrated into a coating incorporating flake elements. Extracting the release layer requires additional process steps that adds complexity and cost to the flake product.

The term "cure" is used herein to describe polymerization or cross-linking of a polymerizable release material. Treatment of a release material with an electron beam causes polymerization in a release monomer material that has a single polymerizing site (such as a mono-acrylate, for example) and cross-linking of a release monomer material that has more than one polymerizing site (such as a diacrylate and triacrylate, to name just a few). Treatment of a release material with plasma (which, as used herein, refers to electrons, ions, free radicals, radiation such as UV) in the absence of etching ionizing gases causes a surface of the release material to cross link. Heat of condensation of the flake material can also cause curing of the surface of a polymerizable release material (or even the whole release layer depending on the layer thickness and the chemistry of the polymerizable monomer)

The term "non-polymerizable" or "un-polymerizable" as used herein defines an organic material that cannot be polymerized by heat or condensation of the flake layer or some types of radiation such as electron beam or UV. A non-polymerizable organic material maybe a condensed organic liquid layer or a condensed organic solid. The latter may be a solid material (such as a wax or an oligomeric wax or a monomer material) that is solid at room temperature, or a non-polymerizable organic liquid that may become solid when deposited on a substrate (such as a rotating drum) that is intentionally cooled below room temperature.

Although the release material may be deposited on a chosen substrate by various methods, embodiments of the present invention utilize the deposition by evaporation or preferably flash evaporation (see, for example, U.S. Pat. No. 4,954,371) and condensation of a release material on a moving substrate. Accordingly, the chemistry of the release material has to be judiciously chosen such that the material can be evaporated and also condensed to remain condensed long enough to allow deposition of the flake layer. To achieve such results, the release material is chosen to have a molecular weight that is in the range of 100 to 5000, and preferably between about 200 and 5000. Release materials having lower molecular weights are difficult to condense and those with much higher molecular weights are difficult to evaporate. At the low end of the molecular weight spectrum most organics are monomers (single molecules) and at the higher end they are mostly usually oligomers with few exceptions of large single molecules.

The term "surface treatment" and similar terms are used to refer to the effect produced by a source of plasma (such as an ion beam or an electron beam, for example) on a chosen surface. In the case of the release material, surface treatment can cause surface curing of an organic layer under conditions that allow the organic layer to be extractable. The term "passivation" is used to refer to a chemical change on the metal layer surface that results in improvement of its resistance to corrosion. Examples of passivation are provided by the formation of a protective oxide, or nitride layer on a metal surface, or a reaction of the metal surface with an organic molecule which results in blocking water molecules from accessing the metal surface.

The terms "surface modification" and "modified surface" are used in reference to the flake layer to mean that a surface is associated with supplementary chemical that is not part of the flake precursor material, but that is intentionally added. For example, in the case of the metal layer, such additional chemical may include organic molecules (other than those of the release material) which contain fluorine atoms to block water from reaching the metal surface, or an organic chromophore that adds color to the metal layer. In implementation of the present invention, modification of a surface of the flake material is accomplished by adding a chemical material in the release material wherein such chemical material is designed to react with the surface of the flake layer to add a certain chemical functionality.

The terms "stack" and "stack defects" may be used interchangeably and refer to aggregation of flakes into a single particle that contain more than one flake layer. An example of such aggregation is provided by elements that include several layers of flake material that have not been separated by the diminution process. The terms "curl" and "curled flake" and "curl defects" may be used interchangeably and refer to individual flakes that have rolled up upon themselves and do not lay flat when the flakes are used to produce a coating, thus creating a visually perceivable defect.

In one implementation of the invention, as illustrated schematically in FIG. 1, a vacuum chamber 100 is used. A release layer deposition station 118 and a flake layer deposition station 112 are configured to operate sequentially to enable the concurrent deposition of the release material and the flake precursor. If the release material is used in liquid form, it is injected into an evaporation system (not shown) that is positioned outside the vacuum chamber and it is evaporated, or preferentially flash-evaporated and converted into a vapor that is guided into the vacuum chamber 100 and deposited onto a chosen substrate using the deposition station 118 through a linear nozzle (not shown) from which the vapor exits towards the substrate. If used in a solid form, the release material is first melted or converted into a powder and then injected into the evaporation system.

The vapor of the release material is caused to condense on a rotating drum 126, which has a polished outer surface and is preferably kept at a temperature <0° C. If and when a surface cure is required, it is accomplished with the use of an electron beam curtain 116, or with a plasma reactor 114, or with the use of the heat of condensation of the flake material. If the flake material deposition station 112 includes a resistively-heated source, then IR radiation from the source also contributes to the surface cure of the release layer. Depending on the accelerating voltage and the thickness of the deposited release layer, the electron beam provided by the unit 116 may penetrate all portions of the release layer and the depth and degree of cure becomes a function of the electron voltage and current. Lower levels of voltage and electron current will cause curing of the surface of the release layer, thereby allowing the release layer to be extractable. The plasma from the reactor 114 has lower energy electrons and/or ions and/or vacuum UV photons, which are absorbed on the surface of the release layer. Therefore in most practical situations where the drum rotates at high speed, the plasma can be used only to cure the surface of the release layer.

Following the deposition of the flake material with the use of the station 112, a second plasma reactor 114 is used to passivate the surface of the flake material.

The process drum 126 rotates typically for 1000s of revolutions and a bulk laminate material 128 is accumulated on its surface. Station 112 is an evaporation or sputtering station for a metal or metal oxide flake material, or an organic vapor deposition station similar to the deposition station 118 in an embodiment where the flake material comprises a polymer layer. In this latter case the liquid organic material may be deposited with the use of the station 112 and may be cured with the use of the radiation source at station 130 (for example, with the use of an electron beam or UV light).

Figure 2:
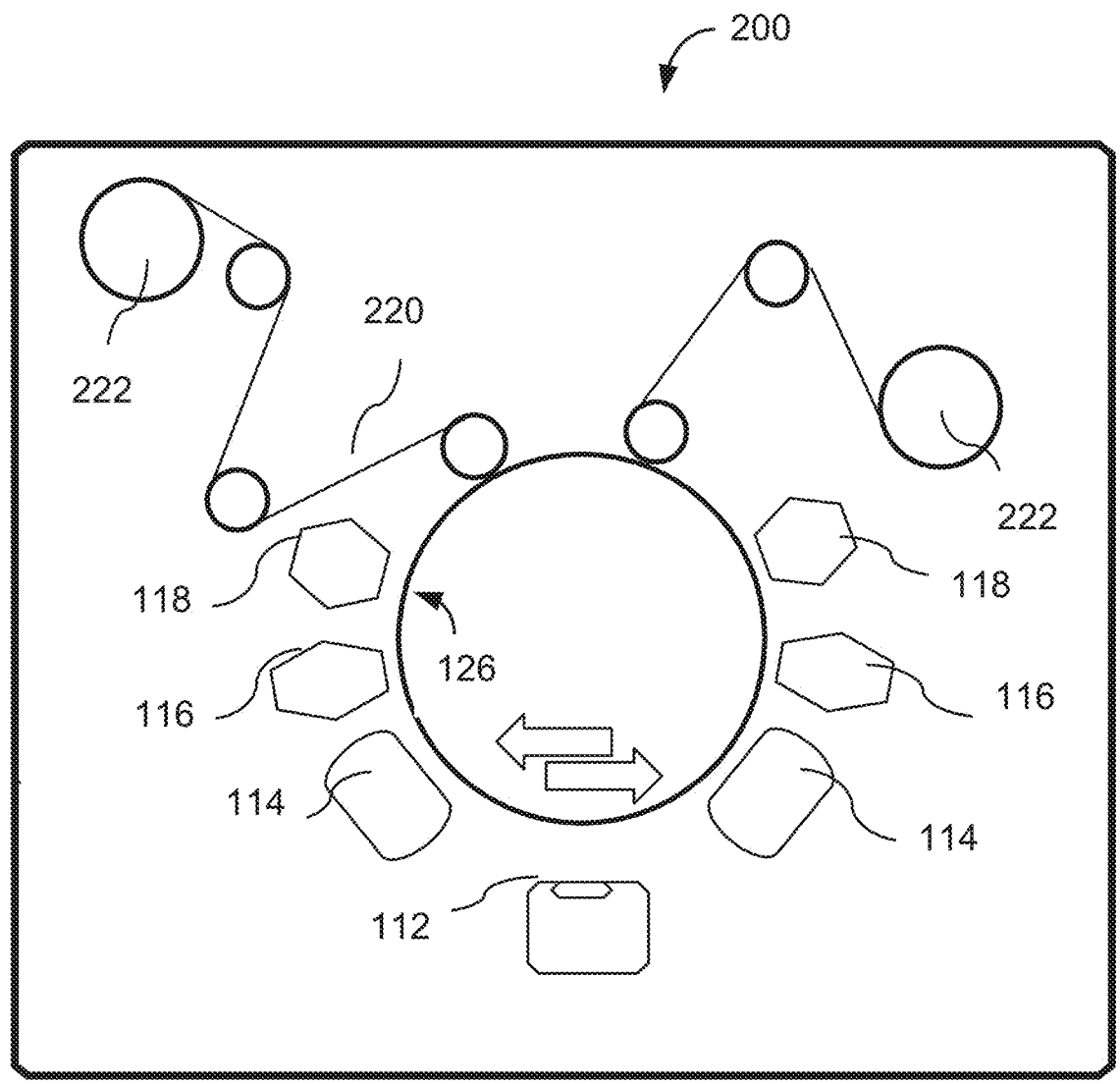
FIG. 2 is a diagram of a vacuum chamber structured, according to an embodiment of the invention, to deposit the release material and the metallic film over a web spooled back and forth between reels.

In a related embodiment, illustrated schematically in reference to FIG. 2, the process can be carried out in a vacuum chamber 200 on a substrate that contains a moving web. As shown, the web 220 may be a film made, for example, from polyester. The release material deposition sources 118 and radiation sources 114 and 116 are placed preferably symmetrically with respect to the process drum 126. The web 220 is unwound and rewound in spools 222. In this manner one or more sets of release and flake material layers can be formed on the web.

It has been determined that, in order to form a highly reflective flake, a liquid release layer formed on a substrate according to an embodiment of the invention has to be thinner than 500 nm and preferably thinner than 100 nm. If this condition is satisfied, then a metal flake layer (for example, a layer of aluminum) can be deposited directly on a non-polymerizable release layer without the requirement of polymerization of the surface of the release layer.

EXAMPLE 1

A non-polymerizable liquid organic release material containing dioctyl phthalate (DOP) with a molecular weight of MW=390 was deposited on a process drum 126 rotating at surface speed of 500 ft/min kept at a temperature of −5° C. in a vacuum chamber 100 of FIG. 1 at a pressure of $1 \times 10^{-3}$ Torr. The thickness of the DOP layer was 35 nm. An aluminum layer with a thickness of 20 nm was deposited on the DOP layer. Due to re-iteration of such deposition processes, a bulk laminate material 128 with 2000 layers was formed on the surface of the drum 126, removed from the process drum. Handling of this material required great care because the aluminum was not passivated and exposure to ambient conditions triggered rapid oxidation, which caused some flakes to curl. In addition, depending on the ambient conditions, the broken down (reduced) multilayer material could also ignite. The bulk material was reduced to flakes in an organic solvent, but although the flakes were reflective many were curled due to heating caused by the rapid oxidation of the unpassivated material when removed from the process drum.

EXAMPLE 2

Bulk laminate material 128 was produced under the same conditions as those described in Example 1, except that passivation of the deposited metal (aluminum) layer was additionally carried out with the use of a plasma reactor containing oxygen gas and operating at 400 KHz with a plasma intensity of 50 W/sq.ft./sec. Under these conditions, the bulk laminate material 128 was safe to handle, and its reduction resulted in flat and reflective flake elements.

EXAMPLE 3

Figure 3A:
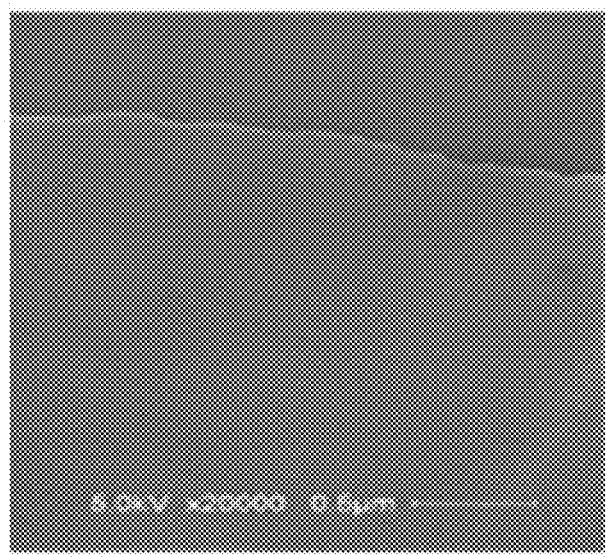
FIGS. 3A, 3B, 3C present micrographs of aluminum flakes with different surface flatness.

In further reference to FIG. 1, a polymerizable liquid organic release material including 4-tert-butylcyclohexyl acrylate with a molecular weight of MW=210 was deposited on a rotating drum 126 kept at a temperature of −14° C. The thickness of the resulting release layer was about 56 nm. While the release material was deposited at a partial pressure of $5 \times 10^{-3}$ Torr, the deposition of a metal (in one implementation—aluminum) material layer with a thickness of 25 nm on the release layer was carried out at partial pressure of $4 \times 10^{-4}$ Torr (in a section around the process drum that was differentially pumped). A bulk laminate material 128, resulting from multiple iterations of such depositions, was formed to contain 2000 pairs of release and flake material layers. Handling of this material 128 also required great care because the aluminum was not passivated and exposure to ambient environment triggered rapid oxidation of the aluminum layer(s). Randomly separating the nanolaminate 128 under an optical microscope confirmed that the surface of the aluminum layers was flat and highly reflective. The nanolaminate 128 was reduced into flakes in diminution process that involved the use of an ethyl acetate solvent. A significant increase in temperature of the solvent was observed due to the sensitivity of the unpassivated aluminum to oxygen and moisture. With the use of the resulting metal flakes, an ink material was formed that, when applied on paper and polymer substrates using a drawdown method, revealed that a number of flakes were curled creating visual defects. Observation of flat flakes under an optical microscope revealed a specular surface. Further observation using an FESEM also showed that both flat and curled flakes did not have any surface nano or microroughness (as shown in the illustration of FIG. 3A.)

EXAMPLE 4

The formation of the multilayer laminate structure 128 was carried out with the same materials and processes as those described in Example 3, except that surfaces of the metallic material (in one case—aluminum) after deposition was exposed to a plasma comprising oxygen gas and formed with the use of a 30 KHz plasma reactor with a plasma intensity of 20 W/sq.ft./sec. The aluminum flake material produced in this manner was passivated, which allowed safe handling of the material and processing without excessive heating. Ink drawdowns showed no curled flake elements.

EXAMPLE 5

Figure 3B:
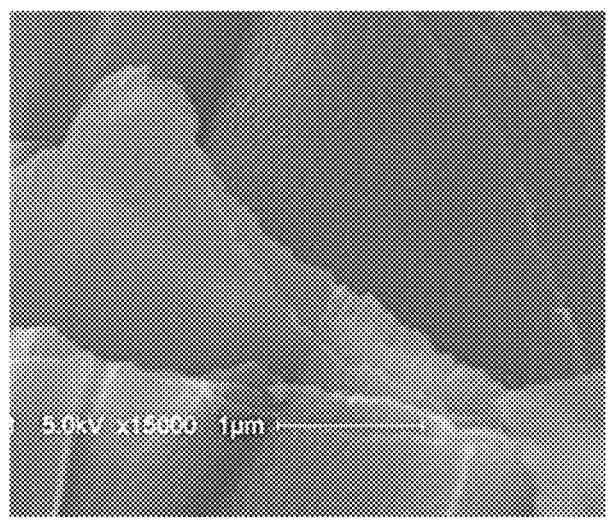
Figure 4:
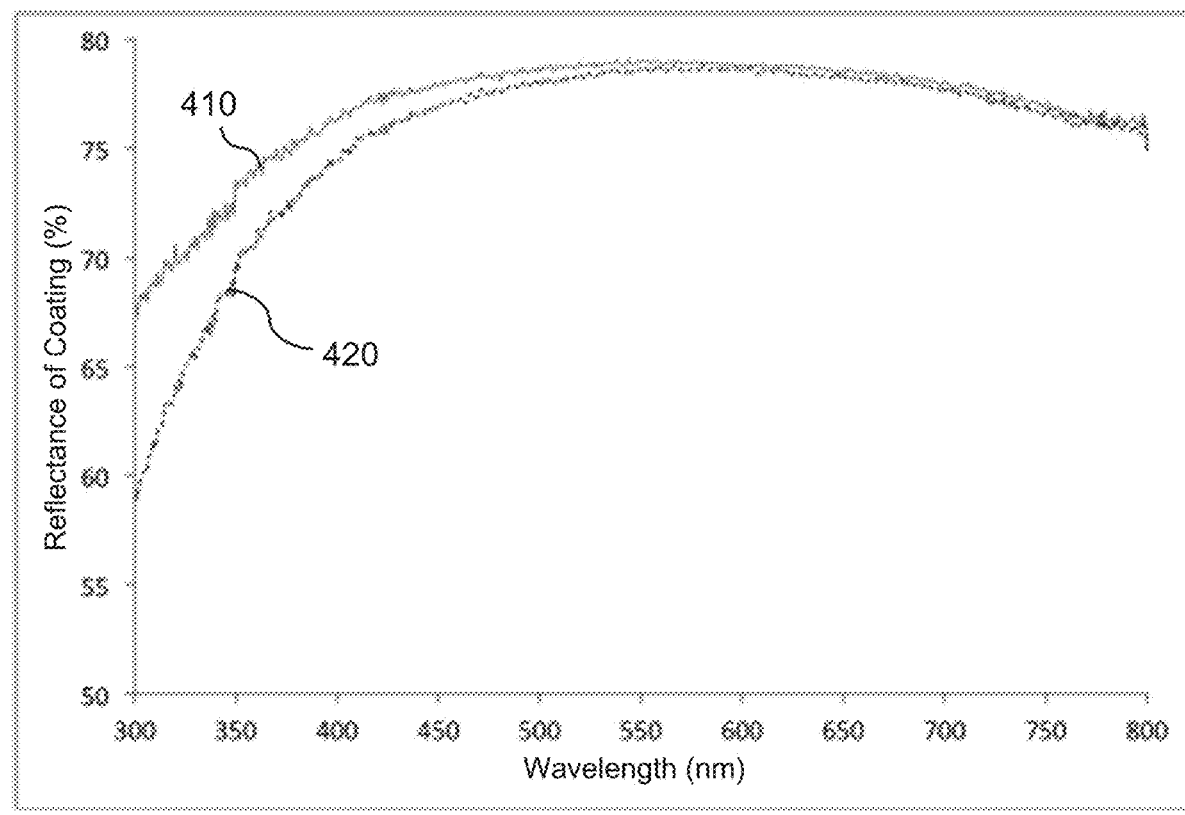
FIG. 4 present plots of UV-VIS reflectance spectra of coatings that includes flakes, fabricated according to embodiments of the invention. The plots indicate the effect of partial dispersion of light.

The formation of the multilayer structure 128 was carried out with the same materials and processes as those described in Example 4, except the thickness of the release 4-tert-butylcyclohexyl acrylate layer was defined to be 84 nm. The nanolaminate 128 was randomly separated and the aluminum layers (as observed under an optical microscope) appeared flat and reflective. Upon reduction of the bulk laminate material 128 into flake elements in an ethyl acetate solution, ink drawdowns showed that the characteristic bluish tinge of the coating was replaced with a light brownish tinge. The result of the UV-VIS spectral analysis of the drawdowns are presented in FIG. 4. Line 420, indicates that the coating produced with the flakes formed according to this process has a lower specular reflection in the blue part of the visible radiation spectrum as with that depicted by line 410 (which represents a coating with flakes produced in Example 4. An FESEM micrograph of a flake, produced in this Example and shown in FIG. 3B, reveals a surface nano-roughness that was not visible in the optical microscope and that contributes to spatial dispersion of blue light while light at other wavelengths is specularly reflected.

EXAMPLE 6

Figure 3C:
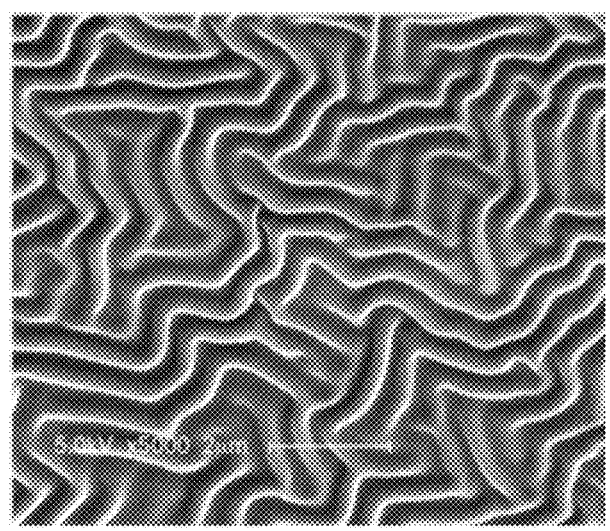

The formation of the multilayer structure 128 was carried out with the same materials and under the same conditions as those discussed in Example 5, except the thickness of the release 4-tert-butylcyclohexyl acrylate layer was defined to be 500 nm. The nanolaminate was randomly separated and the aluminum layers as observed under an optical microscope looked visually hazy and furrowed. Reduction of the bulk laminate material 128 into flakes elements showed that the flakes were also furrowed as shown in the FESEM micrograph of FIG. 3C.

In the course of many trials conducted to reproduce flakes with furrowed surfaces, organic chemistry of the liquid release layer on which the aluminum was deposited were varied, but no polymerizable (or curable) organic material or non-polymerizable liquid release material was found that did not exhibit furrows at thicknesses of one micrometer or higher, and most materials displayed furrows at release layer thickness of about 500 nm. As the thickness of the release layer was reduced, the dimensions of the furrows also decreased and the furrowed flake material, instead of dispersing visible radiation, started to create random colors that changed with the viewing angle. Given that the orientation of the furrows is random, the overall effect is a pearlescent effect superimposed on the somewhat metallic grey color of aluminum flake material. A variety of such furrowed flake elements were produced, some of which dispersed some or all of the visible radiation, some that produced interference of the visible radiation and colors that varied with angle of incidence, and others that dispersed visible but were specular in the Infra-Red (IR). It was determined that the latter group of the flake elements has applications in the area of radar signature reduction and concealment, where a metallic-pigment-based coating is required that has specular reflection in the IR but does not have a metallic glint.

EXAMPLE 7

The experiment described in Example 4 was repeated, except a polymerizable monomeric organic material containing 3 weight-% of propoxylated 2 neopentyl glycol diacrylate was added to the release material. After reducing the laminate 128 to flakes and producing ink drawdowns, it was observed that a large number of stack defects were present in the coating. Many stack defects were about the same size as the flakes and some were larger. The combination of the stack particle size and the stack orientation given their three dimensional form, created visual irregularities in an otherwise uniformly metallic reflective coating.

The addition of a small amount of diacrylate to the release material of Example 7 led to the production of a significant number of stack defects. Most polymerizable release materials (when used with thicknesses of less than 100 nm) were empirically demonstrate to have certain level of stack type defects. Increasing the thickness of polymerizable release materials eliminated stack defects, but at the expense of nano-roughness and micro-roughness or furrows appearing on the surface of the flake material. Therefore, in order to produce a flat flake with no stacks and minimized or no surface roughness, the use of a low-thickness liquid release layer is required made with the use of either a non-polymerizable organic compound or a mixture of a polymerizable and non-polymerizable release materials. It was demonstrated that specific non-polymerizable compounds that also act to inhibit polymerization are particularly useful for formulation of a release material. Such compounds include, for example, heterocyclic and polycyclic aromatics, quinones, phenols, thiols, anulenes, amines and cartechols.

One exception to the release layer thickness limitations is the use of non polymerizable solid release materials.

The production of metallic flakes with the use of a surface modification process was also specifically addressed. A modified surface may exhibit several different types of functionality. For example, the chemical functionality of a modified surface may manifest in hydrophobicity or hydrophilicity of the surface, or surface coloration, or antibacterial property, or some combination of properties. In one implementation of the present invention, it was demonstrated that chemical functionalities of a target surface can be achieved by adding a reactive chemical to the release layer to be transferred via a reaction to the metallic (flake) layer. Reactive species that were most advantageous for reaction with a surface of the metallic layer in the case when aluminum was used were determined to contain acid functional groups. In reference to Example 8 below, such materials with acid functional groups include acid-based color dies that are useful to change the color of the flake surface, and olephinic and fluoro molecules that act as corrosion inhibitors. The efficiency of this process is very high because the reactions with a surface of aluminum layer take place before the aluminum is passivated. In contrast, when such reactive materials were added into the solvent in which the flake material diminution process took place, the surface reactions were more difficult and complex due to the presence of the already-formed aluminum oxide on the surface of the aluminum layer.

EXAMPLE 8

The formation of the multilayer structure 128 was carried out with the same materials and under the same conditions as those discussed in Example 3, except 5% by weight of perfluorooctadecanoic acid was added to the release material. Both the resulting bulk nanolaminate and flake material had superior corrosion resistance. The fluoro acid has a highly phobic tail that prevents moisture from coming into contact with the aluminum surface. A test was conducted where a first bulk laminate material 128 formed in this experiment and a second bulk laminate material formed as a result of the process described in Example 3 were placed, for the same amount of time, in a pressure cooker operating at 125° C. and 25 psig. The aluminum in the second bulk laminate material was converted mostly into hydrated aluminum oxide that was visually white, while there was little or no change in the bright metallic look of the aluminum (of the first bulk laminate material) that was surface modified with the phobic fluoro compound. According to embodiments of this invention, the flake material may also be a polymer material that produces polymer flakes with specific polymer properties such as high or low refractive index and color. Such polymer materials may be deposited inline with the release coating and be cured using electron beam or UV radiation. As taught in U.S. Pat. Nos. 4,482,893, 6,447,553 and 7,005,161, for example, monomeric and oligomeric polymerizable organic liquids such as acrylates can be deposited in the vacuum on a substrate by flash evaporation and condensation. Curing of such liquids is accomplished using radiation such as electron beam and UV. During the curing step, the radiation dose is set up to penetrate the condensed liquid layer and cure it throughout its volume. This treatment is different from using radiation such as plasma or electron beam that is set up to cure or harden primarily the surface of a curable liquid release layer. We discovered that a) two liquid layers can be deposited on a substrate in sequence and maintain complete separation, at least for the time period between their deposition and cure, and that b) if two polymerizable liquid layers are deposited on top of each other, it is not practically possible to cure the top layer by radiation throughout its volume without curing the layer below. Therefore, in order to produce a polymer flake where the polymer is formed in the vacuum by radiation curing, the release layer cannot be a polymerizable organic material. It was determined that, instead, in order to produce polymer flake material with such process, the release layer has to include a non polymerizable organic material which can be a solid or a liquid upon being deposited on a substrate. The same process can also be used to produce composite flake materials by adding the necessary flake material deposition stations around a process drum. Such composite flakes may include combinations of a metal with one or more polymer layers or a metal oxide with polymer layers.

EXAMPLE 9

Figure 5:
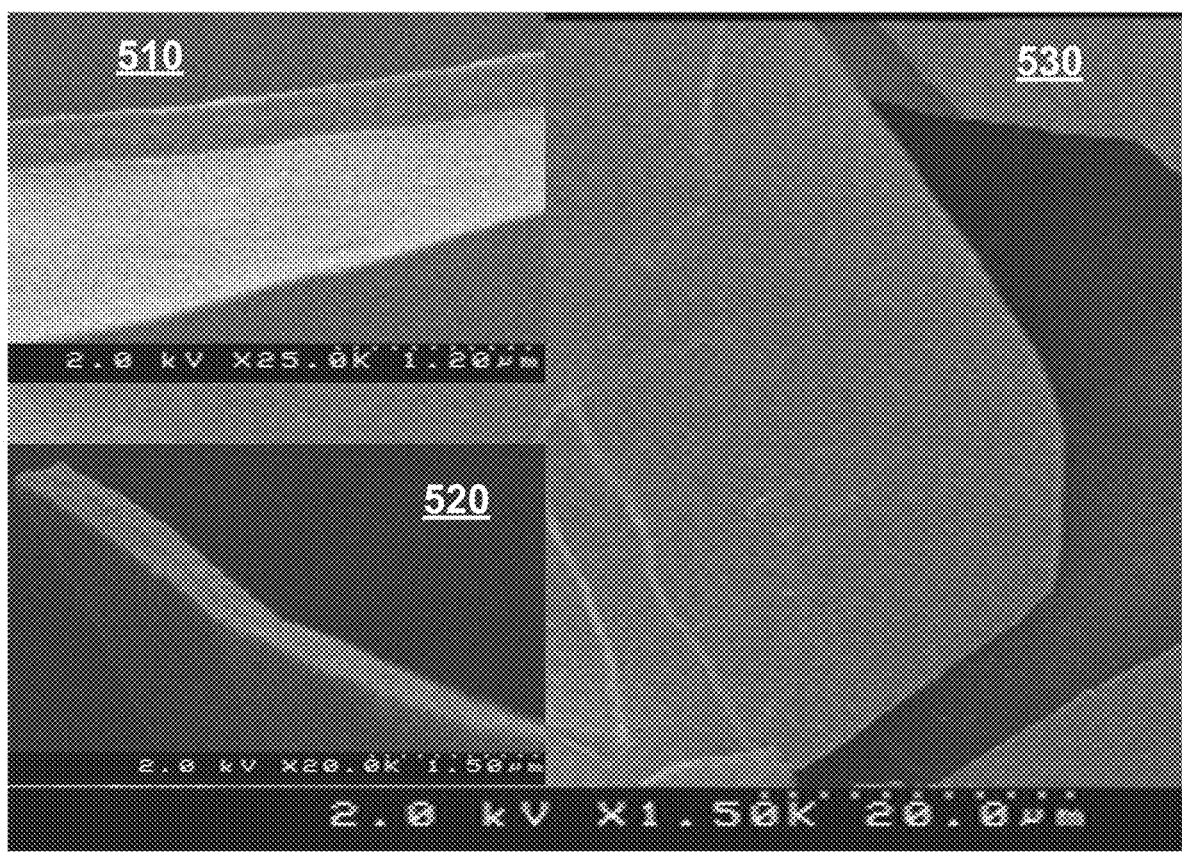
FIG. 5 provides field emission SEM (FESEM) micrographs of a flake, fabricated according to an embodiment of the invention. Inserts: cross-sections of the flake; main micrograph: top view.

A flake material with a stack structure of polymer/aluminum/polymer was produced using the deposition of octadecane (a non-polymerizable release layer with a thickness of 40 nm) on a substrate, followed by the deposition of a first electron-beam-cured monomer layer (comprising hexane diol diacrylate and trimethylolpropane triacrylate), followed by the deposition of an aluminum layer and a second electron-beam-cured monomer layer. Both the polymer layer formed prior to the aluminum deposition and aluminum layer were treated with an oxygen-containing plasma using a 30 kHz power supply with a plasma intensity of 30 W/ft/sec. The pressure in the chamber was $5 \times 10^{-4}$ mTorr and each polymer layer thickness was approximately 180 nm. FESEM micrographs of polymer/aluminum/polymer flakes are shown in FIG. 5. Micrographs 510 and 520 (inserts) show cross-sections of the flake, while the micrograph 530 shows the flake in top view. Flake elements produced in such manner are flat, highly reflective, and have much higher mechanical and corrosion degradation resistance.

As one skilled in the art will readily appreciate, the polymer/metal/polymer stack formed according to one embodiment of the invention may have a colored polymer layer, while the aluminum layer may be optionally furrowed to create certain effects that may be useful in applications that address the visible or infrared spectra. Also, the release layers deposited according to an embodiment of the invention may by formed with a large variety of polymerizable and non-polymerizable compounds and combinations thereof. The release layers are flash evaporated and condensed on the substrate as a liquid or a solid. For example, fatty alcohols and fatty acids and olephinic materials with chains longer than those of octadecane are solid at room temperature and they have to be melted to be injected into the evaporator. Upon deposition on the substrate such materials will re-solidify. Solid non-polymerizable materials work equally well when used in embodiments of this invention for formation of release layers. Furthermore, in one embodiment a liquid release material such as, for example, hexadecane or smaller olephinic molecules may be used for formation of release layers. These materials are liquid at room temperature, but will solidify upon deposition on a substrate kept at a temperature that is lower than the solidification point of the chemical.

We found that, for the purposes of production flat reflective flakes without defects (such as stacks and nano- and micro-roughness of flake surface), the use of the specific solid non-polymerizable release materials does not impose a limitation on thickness of a release layer. The release materials from group may be solids at room temperature or, alternatively, solids because the temperature of the substrate on which such materials are deposited is below a corresponding melting point.

The monomer and oligomer materials that may be used to formulate release materials generally have molecular weights in the range of 100 to 5000 and include:

1. Acrylated monomers with various degrees of functionality such as aliphatic, cyclo-aliphatic, aromatic, that may be a pure hydrocarbon, halogenated, metalated, for example.
2. Alcohols such as allyl, methallyl, crotyl, 1-chloroallyl, 2-chloroallyl, cinnamyl, vinyl, methylvinyl, 1-phenallyl and butenyl alcohols; and esters of such alcohols with (i) saturated acids such as acetic, propionic, butyric, valeric, caproic and stearic, (ii) unsaturated acids such as acrylic, alpha-substituted acrylic (including alkylacrylic, e.g., methacrylic, ethylacrylic, propylacrylic, and the like, and arylacrylic such as phenylacrylic), crotonic, oleic, linoleic and linolenic; (iii) polybasic acids such as oxalic, malonic, succinic, glutaric, adipic, pimelic, suberic, azelaic and sebacic; (iv) unsaturated polybasic acids such as maleic, fumaric, citraconic, mesaconic, itaconic, methylenemalonic, acetylenedicarboxylic and aconitic; and (v) aromatic acids (e.g., benzoic, phenylacetic, phthalic, terephthalic and benzoylphthalic acids).
3. Acids and esters with lower saturated alcohols, such as methyl, ethyl, propyl, isopropyl, butyl, isobutyl, sec-butyl, tert-butyl, 2-ethylhexyl and cyclohexyl alcohols, and with saturated lower polyhydric alcohols such as ethylene glycol, propylene glycol, tetramethylene glycol, neopentyl glycol and trimethylolpropane.
4. Fatty acids and fatty alcohols such as lauryl, stearyl, oleic and others with longer hydrocarbon chains.
5. Lower polyhydric alcohols, e.g., butenediol, and esters thereof with saturated and unsaturated aliphatic and aromatic, monobasic and polybasic acids, examples of which are provided above.
6. Esters of the above-described unsaturated acids, especially acrylic and methacrylic acids, with higher molecular weight monohydroxy and polyhydroxy materials such as decyl alcohol, isodecyl alcohol, oleyl alcohol, stearyl alcohol, epoxy resins and polybutadiene-derived polyols.
7. Vinyl cyclic compounds including styrene, o-, m-, p-chlorostyrenes, bromostyrenes, fluorostyrenes, methylstyrenes, ethylstyrenes and cyanostyrenes; di-, tri-, and tetrachlorostyrenes, bromostyrenes, fluorostyrenes, methylstyrenes, ethylstvrenes, cyanostyrenes; vinylnapthalene, vinylcyclohexane, divinylbenzene, trivinylbenzene, allylbenzene, and heterocycles such as vinylfuran, vinylpridine, vinylbenzofuran, N-vinylcarbazole, N-vinylpyrrolidone and N-vinyloxazolidone.
8. Ethers such as methyl vinyl ether, ethyl vinyl ether, cyclohexyl vinyl ether, octyl vinyl ether, diallyl ether, ethyl methallyl ether and allyl ethyl ether.
9. Ketones, e.g., methyl vinyl ketone and ethyl vinyl ketone.
10. Amides, such as acrylamide, methacrylamide, N-methylacrylamide, N-phenylacrylamide, N-allylacrylamide, N-methylolacrylamide, N-allylcaprolatam, diacetone acrylamide, hydroxymetholated diacetone acrylamide and 2-acrylamido-2-methylpropanesulfonic acid.
11. Aliphatic hydrocarbons; for instance, ethylene, propylene, butenes, butadiene, isoprene, 2-chlorobutadiene and alpha-olefins in general.
12. Alkyl halides, e.g., vinyl fluoride, vinyl chloride, vinyl bromide, vinylidene chloride, vinylidene bromide, allyl chloride and allyl bromide.
13. Acid anhydrides, e.g., maleic, citraconic, itaconic, cis-4-cyclohexene-1,2-dicarboxylic and bicyclo(2.2.1)-5-heptene-2,3-dicarboxylic anhydrides.
14. Acid halides such as cinnamyl acrylyl, methacrylyl, crotonyl, oleyl and fumaryl chlorides or bromides.
15. Nitriles, e.g., acrylonitrile, methacrylonitrile and other substituted acrylonitriles.
16. Monomers with conjugated double bonds.
17. Thiol monomers.
18. Monomers with allylic double bonds.
19. Monomers with epoxide groups.
20. Monomers that comprise halogenated functional groups.
21. Organic color dies, including acid based color dies.

Embodiments of the invention demonstrate the advantageous improvements to the flake-fabrication process obtained by controlling the thickness and the chemistry of the release layers as well as passivating the surface(s) of the flake material layer(s). The disclosed solutions facilitate the production of flat, corrosion-resistant flakes with no or minimum number of curled flakes or stacks that can result in visual defects when such flakes are integrated into a coating.

In one instance, the concurrent vacuum deposition of the release layer and flake material is carried out continuously on a rotating drum, thereby producing a continuous spiral of arbitrary length. This allows the continuous in-line production of a large bulk volume of flake-material film embedded between release material layers, which in turn yields extensive quantities of flakes by crushing the laminate material and dissolving the release. In a related instance, the process is carried out in a vacuum chamber containing a second unit for the deposition of release material at the tail end of the sequential stages. In such a case, instead of depositing continuously on a rotating drum, the process is carried out by depositing sequentially a layer of release material and of flake material on a web moving between spools in one direction, and then by depositing another layer of release material and flake material while the web is moved in the opposite direction, thereby forming a multilayer structure of alternating release and flake materials on the web. Alternatively, after the deposition of the initial release layer, the process is carried out by depositing sequentially a layer of flake material and release layer on the web moving between the spools in one direction, and then by depositing again flake material and release material while the web is moving in the opposite direction.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, it is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Various changes in the details, steps and components that have been described may be made by those skilled in the art within the principles and scope of the invention.

The invention claimed is:

1. A process for producing ultra-bright passivated flake elements, the process comprising:
   a) flash evaporating in a vacuum environment a solid non-polymerizable organic layer that has a molecular weight in the range of 100 to 5000 onto a substrate, said non-polymerizable organic layer comprising an organic material that is dissolvable in a solvent;
   b) depositing a layer of a first material on a surface of said solid non-polymerizable organic layer in the vacuum environment, said first material comprising metal;
   c) passivating said layer of the first material comprising metal by plasma treatment in line with said depositing in the vacuum environment using a reactive gas comprising oxygen to form a non-hydrated metal oxide;
   removing the metal layer from the substrate, by dissolving said solid non-polymerizable organic layer with the solvent, to form first material flake elements.

2. A process of claim 1, further comprising repeating the steps a), b) and c) multiple times to form said multilayer structure that contains more than two layers.

3. A process of claim 1, wherein the applying a solid non-polymerizable organic layer includes applying a solid non-polymerizable organic layer on a rotating drum.

4. A process of claim 1, wherein the applying a solid non-polymerizable organic layer includes applying a solid non-polymerizable organic layer on a polymer web.

5. A process of claim 1, wherein said depositing includes depositing the first material comprising aluminum.

6. A process of claim 1, comprising applying to the substrate organic additives that are configured to react with a surface of the layer of the first material.

7. A process of claim 6, wherein the applying includes applying said organic additives that are configured to react with the surface of the layer of the first material to cause effects that include reducing access of moisture to said surface.

* * * * *